United States Patent
Shirai (10) Patent No.: US 6,194,694 B1
(45) Date of Patent: Feb. 27, 2001

(54) SURVEYING INSTRUMENT (75) Inventor: Masami Shirai, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/288,566

(22) Filed: Apr. 9, 1999

(30) Foreign Application Priority Data

Apr. 10, 1998 (JP) .................................................. 10-099688

(51) Int. Cl.[7] .............................. G01C 15/00; G02B 7/28
(52) U.S. Cl. ...................................... 250/201.2; 356/375
(58) Field of Search ............................ 250/201.2, 201.4, 250/201.6, 201.7, 201.8, 559.29, 559.31; 356/375; 359/399, 400, 401, 425, 426, 427, 429, 430, 431

(56) References Cited

U.S. PATENT DOCUMENTS

| | | |
|---|---|---|
| 5,053,801 | 10/1991 | Ishida et al. . |
| 5,243,375 | 9/1993 | Ishida et al. . |
| 5,796,517 * | 8/1998 | Sensui et al. .......................... 359/426 |
| 5,844,231 * | 12/1998 | Suzuki et al. ....................... 250/201.2 |
| 5,856,663 * | 1/1999 | Suzuki et al. ....................... 250/201.2 |
| 5,856,664 * | 1/1999 | Suzuki et al. ....................... 250/201.2 |
| 5,886,340 * | 3/1999 | Suzuki et al. ....................... 250/201.7 |
| 5,936,736 * | 8/1999 | Suzuki et al. .......................... 356/375 |

* cited by examiner

Primary Examiner—John R. Lee
(74) Attorney, Agent, or Firm—Greenblum & Bernstein, P.L.C.

(57) ABSTRACT

A surveying instrument is provided with a sighting telescope, an auto-focusing system, a switch and a correction system for correcting a focusing state. The correction system controls the auto-focusing system, in response to an operation of the switch, to change a focusing state of the image of the sighting telescope from a first state to a second state. The first state is a state where an object whose object distance is a first distance is focused on, and the second state is a state where an object whose object distance is a second distance is focused on, wherein the second distance is substantially a half of the first distance.

7 Claims, 5 Drawing Sheets

SURVEYING INSTRUMENT

BACKGROUND OF THE INVENTION

The present invention relates to a surveying instrument employing a sighting telescope having an auto-focusing function.

Conventionally, a surveying instrument such as an electric distance meter, an electronic theodolite, and the like have been known. The distance meter is for measuring a distance to an aiming point, and the theodolite, or an angle measuring instrument is for measuring horizontal and vertical (elevational) angles between a reference point and an aiming point.

In such a surveying instrument, a sighting telescope is provided for accurately sighting the instrument on an aiming point. By aligning the sighting telescope so that the aiming point is located at the center of field of view, the axis of distance measuring or measuring the horizontal and elevational angles is aligned to intersect the aiming point.

In order to view the aiming point clearly within the field of view of the sighting telescope, a focusing mechanism is provided. The focusing mechanism is to be manipulated so that an in-focus image of the aiming point is formed. To ease the focusing operation, recently, auto-focusing system have been employed in the sighting telescopes.

With the auto-focusing function, the focusing condition of the sighting telescope is automatically adjusted. Thus, the auto-focusing function makes the operator free from troublesome manipulation of focusing mechanism, and allows the operator to concentrate on centering the aiming point in the field of view of the sighting telescope.

In such a sighting telescope, when surveying is performed, a reflector is located at the aiming point. Generally, a corner cube is used as the reflector. The corner cube reflects an incident ray of light along the same direction thereof. Accordingly, when an operator sights the sighting telescope on the corner cube, and the optical axis of the sighting telescope intersects a reflection surface of the corner cube, the auto-focusing system focuses on a virtual image of the telescope formed by the corner cube. That is, the auto-focusing system focuses on an object (i.e., the telescope) located at twice a distance of the corner cube. Then, the corner cube in the field of view is fuzzy (out-of-focus), and the operator has to manipulate the focusing system, even if the auto-focusing system is employed, to focus on the corner cube.

SUMMARY OF THE INVENTION

It is therefore an object of the present invention to provide a surveying instrument employing a sighting telescope having an auto-focusing system which enables an operator to re-focus on the reflector if the auto-focusing system focuses on the virtual image of the telescope formed by the reflector.

For the above object, according to the invention, there is provided a surveying instrument, which is provided with a sighting telescope that is utilized to sight on a reflector (which may be a corner cube) located at an aiming point; an auto-focusing system which adjusts a focusing state of an image in a field of view of the sighting telescope; a switch; and a correction system that controls the auto-focusing system, in response to an operation of the switch, to correct a focusing state of the image of the sighting telescope from a first state to a second state, the first state being a state where an object whose object distance is a first distance is focused on, the second state being a state where an object whose object distance is a second distance is focused on, the second distance being substantially a half of the first distance.

With the surveying instrument having the above constitution, if the telescope focuses on the virtual image of itself formed by the reflector located at the aiming point, the focusing state can quickly changed such that the reflector is focused on only by depressing a single switch.

Optionally, the auto-focusing system may include: a focusing lens; a defocus amount detecting system that detects a defocus amount with respect to a predetermined image receiving plane of the sighting telescope; and a first driving amount calculating system that calculates a driving amount of the focusing lens of the auto-focusing system based on the defocus amount.

Further, the correction system may include: a lens position detecting system that detects a first position of the focusing lens when focusing on an object located at the first distance; a lens position determining system that determines, based on the first position, a second position of the focusing lens for focusing on an object located at the second distance; and a lens driving system that drives the focusing lens to the second position.

Furthermore, the lens position determining system may include: a first distance calculating system that calculates the first distance based on the first position detected by the lens position detecting system; and a lens position calculating system that calculates the second position for focusing on an object located at a distance which is a half of the first distance, wherein the lens driving system drives the focusing lens by an amount which is equal to a difference between the second position and the first position.

The surveying instrument may include a electronic theodolite and/or a distance metering device. In particular case, the surveying instrument is a total station.

DETAILED DESCRIPTION OF THE PREFERRED EMBODIMENT

The preferred embodiment will be described hereinafter in detail with reference to the accompanying drawings.

Figure 1:
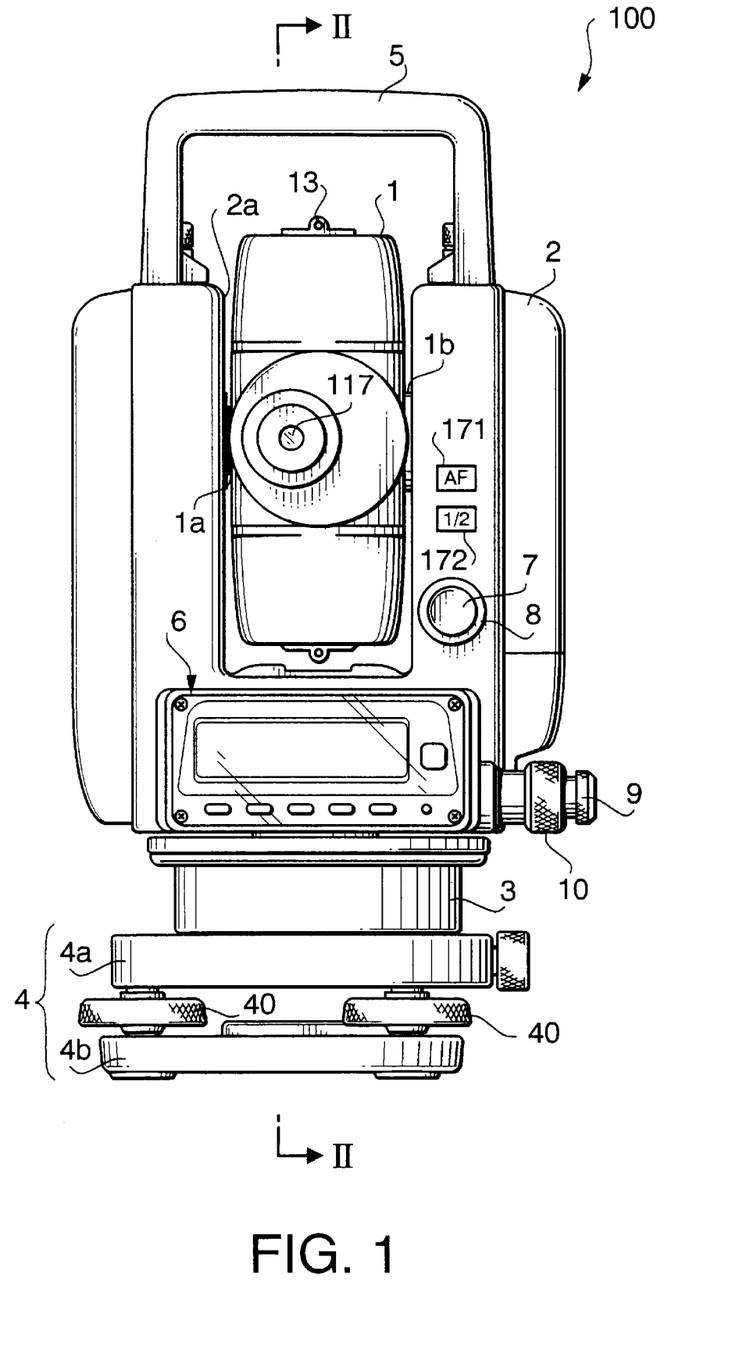
FIG. 1 is a front view showing a surveying instrument according to an embodiment of the present invention.
Figure 2:
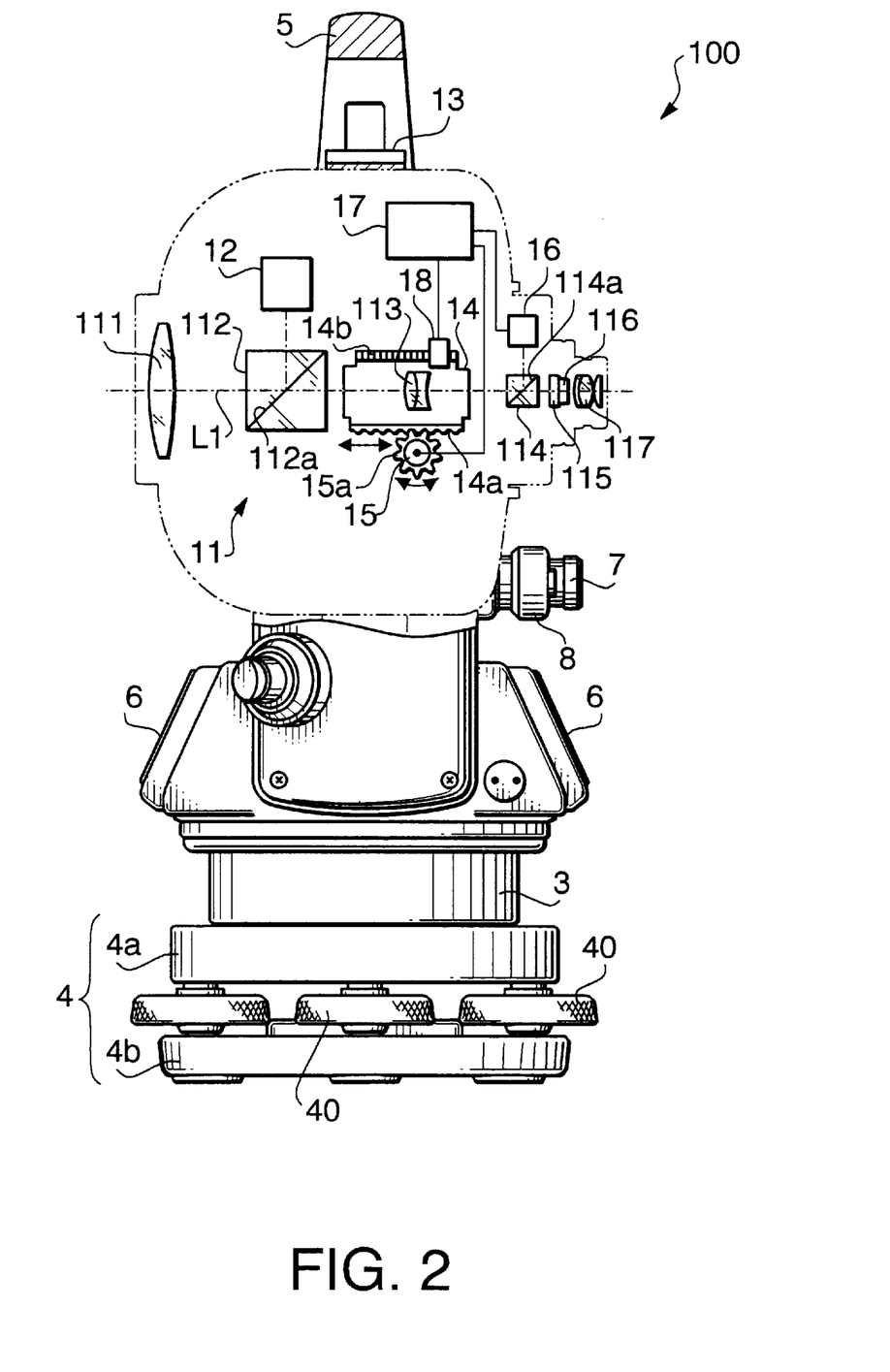
FIG. 2 is a partially sectioned side view (taken from line II—II in FIG. 1) of the surveying instrument.
Figure 3:
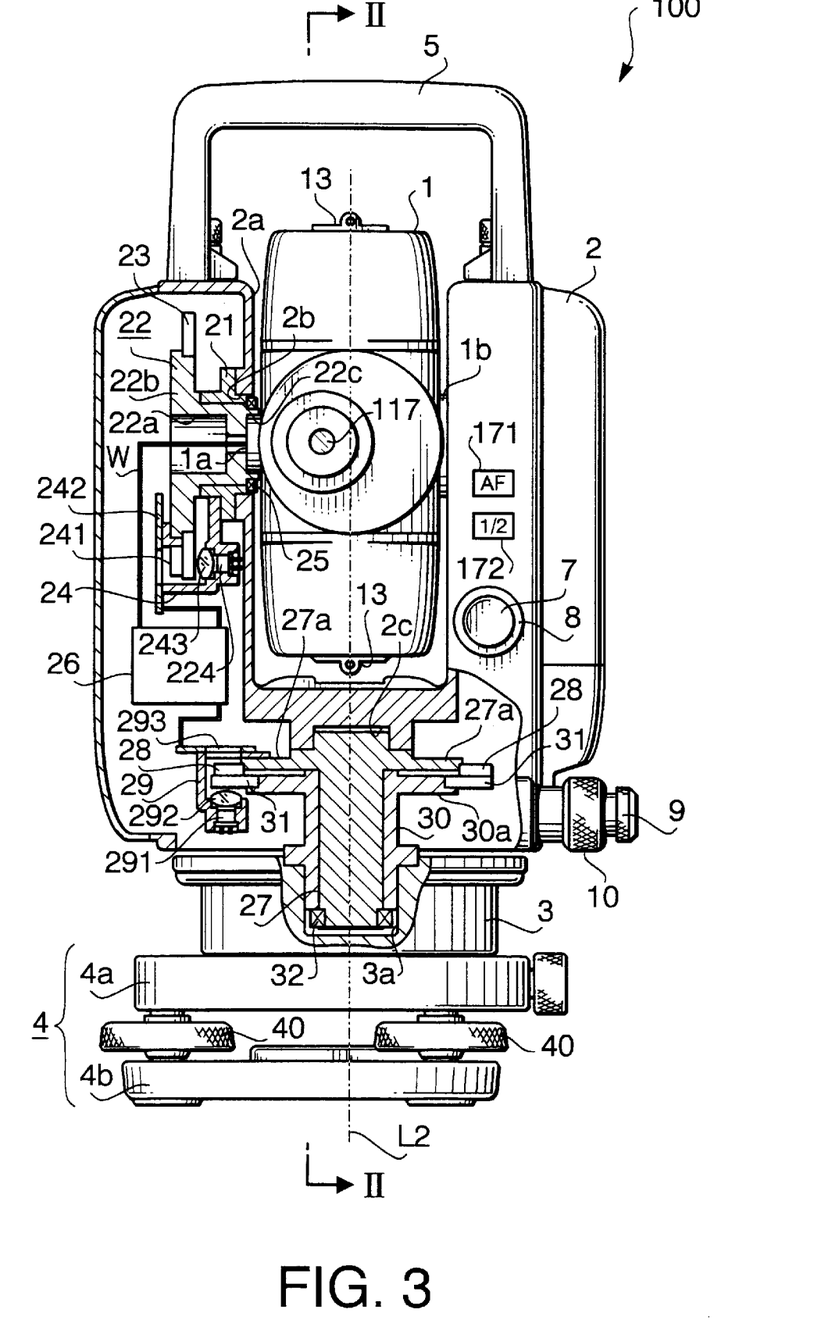
FIG. 3 is a partially sectioned front view showing the surveying instrument.

FIG. 1 is a front view of a total station 100 according to an embodiment of the present invention, FIG. 2 is a partially sectioned side view, taken along line II—II in FIG. 1, and FIG. 3 is a partially sectioned front view of the total station 100.

As shown in FIGS. 1 through 3, the total station 100 is provided with a leveling board 4, a stage 3, a U-shaped support 2, and a grip 5.

A telescope unit 1 is rotatably supported by the U-shaped support 2. The telescope unit 1 includes a telescope 11 and an electronic distance metering unit 12. By sighting the telescope unit 1 on an aiming point, where a reflector (corner cube) is placed, the distance to the aiming point and the horizontal and vertical angles between a predetermined reference point and the aiming point are measured.

Specifically, the electronic distance metering unit 12 measures a distance to the reflector, which is located on the optical axis of the telescope 11, by emitting modulated light beam to the reflector and receiving the reflected beam, via an objective lens 111 of the telescope 11.

As shown in FIG. 2, the telescope 11 has an objective lens 111, a dichroic prism 112, a focusing lens 113, a beam splitter 114 for a focusing sensor 16, a covering glass 115, a cross hair focusing plate 116, and an eyepiece 117.

L1 denotes the optical axis L1 of the objective lens 111, and will also be referred to as a sighting axis.

The dichroic prism 112 has a beam splitting surface 112a which is inclined by 45 degrees with respect to the sighting axis L1. The beam splitting surface 112a reflects 100% of incident infrared light, and allows 100% of incident visible light to pass therethrough.

The focusing lens 113 is a negative lens having a shorter focal length than the objective lens 111. The focusing lens 113 is held in a barrel 14. The barrel 14 is movable, together with the focusing lens 113, along the sighting axis L1 for focusing.

Specifically, on the outer circumferential surface of the barrel 14, a rack 14a, which extends in parallel with the sighting axis L1, is formed. The rack 14a is engaged with a pinion 15a which is driven by a focusing lens driving unit 15. As the focusing lens driving unit 15 rotates the pinion 15a, the focusing lens 113 moves back and forth (right-and-left direction in FIG. 2) along the sighting axis L1, and the image plane moves in a direction parallel to the sighting axis L1.

Further, on the outer surface of the lens barrel 14, a code pattern 14b, which includes a plurality of codes, and extends in parallel with the sighting axis L1, is formed. Each of the plurality of codes represent a unique position of the focusing lens 113 with respect to a predetermined reference position. Furthermore, a code detector 18 is fixedly provided inside the telescope unit 1. The code detector 18 faces the code pattern 14b to detects a code of the code pattern 14b. The code detector 18 transmits a signal indicative of a detected code to a control circuit 17.

The beam splitter 114 has a beam splitting surface 114a which is inclined by 45 degrees with respect to the sighting axis L1. The beam splitting surface 114a reflects a part of incident light, and allows the remaining light to pass therethrough.

The cross hair focusing plate 116 is a parallel glass plate, which has cross hairs on a surface (i.e., an image receiving plane) facing the covering glass 115. The crossing point of the cross hairs indicates the center of the field of view of the telescope 11. The covering glass 115 is also a parallel glass plate, which covers the image receiving plane of the cross hair focusing plate 116 and prevents particles of dust from adhering thereon.

The eyepiece 117 has a group of lenses and exhibits a positive power. Through the eyepiece 117, the operator observes the enlarged image of the cross hairs as well as the image formed on the image receiving plane of the cross hair focusing plate 116.

A distance to the aiming point is measured by the electronic distance metering unit 12. It should be noted that when the distance to the aiming point is measured, the sighting axis L1 is aligned to intersect the aiming point.

The electronic distance metering unit 12 is arranged on an optical path which is deflected upwardly by the dichroic prism 112. The electronic distance metering unit 12 emits an infrared light beam, which is periodically amplitude-modulated, to the dichroic prism 112. The modulated light beam is reflected by the beam splitting surface 112a, and directed, via the objective lens 111, to the reflector (i.e., the corner cube) located at the aiming point. The light beam is then reflected by the reflector, passing through the objective lens 111, reflected by the beam splitting surface 112a, and is incident on the electronic distance metering unit 12. The electronic distance metering unit 12 detects a phase difference between the emitted light beam and the reflected light beam, and transmits the detected phase difference to a surveying control circuit 26 (see FIG. 3).

The objective lens 111 functions, on one hand, as a collimating lens which collimates the light beam emitted by the electronic distance metering unit 12 and directing the light beam toward the reflector at the aiming point as a parallel light beam, and, on the other hand, as a collecting lens for collecting the light beam reflected by the reflector and directing the reflected beam to the dichroic prism 112 as a converging beam.

The focusing sensor 16 is arranged on another optical axis, which is split by the beam splitter 114. The focusing sensor 16 is of a sensor utilizing a phase difference detecting method, and is any one of the sensors widely employed in auto-focusing systems for single lens reflex cameras. The focusing sensor 16 detects a defocus amount with respect to the image receiving plane (or a plane conjugate therewith) of the cross hair focusing plate 116. A defocus signal, which represents the defocus amount, is transmitted from the focusing sensor 16 to the focusing control circuit 17.

Figure 4:
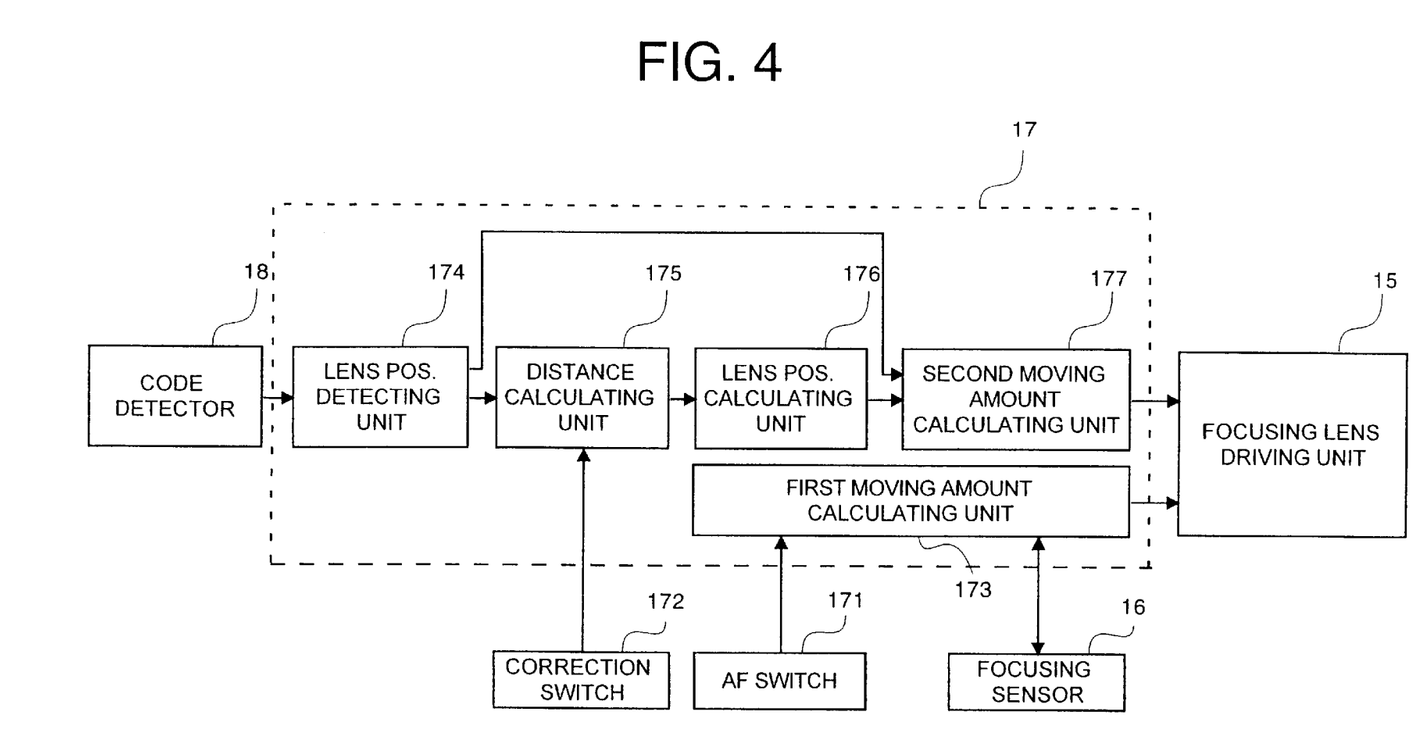
FIG. 4 is a block diagram showing a focusing control system of the surveying instrument.

FIG. 4 is a block diagram of a the focusing control circuit 17.

As shown in FIG. 4, the focusing control circuit 17 is connected with the focusing lens driving unit 15, the focusing sensor 16, the code detector 18, an AF switch 171, and a correction switch 172 (a function of the correction switch 172 will be described later). The AF switch 171 and the correction switch 172 are provided on the outer surface of the support 2. Alternately or optionally, a switch provided in the operation panel 6 may be used as the half switch.

The focusing control circuit 17 includes a first moving amount calculating unit 173, a lens position detecting unit 174, a distance calculating unit 175, a lens position calculating unit 176, and a second moving amount calculating unit 177.

A well-known auto-focusing operation is performed when the AF switch 171 is operated. Specifically, when the AF switch 171 is depressed, the first moving amount calculating unit 173 controls the focusing sensor 16 to detect the defocus amount, and calculates a moving amount and a moving direction of the focusing lens 113 for canceling the defocus amount which is transmitted from the focusing sensor 16. Then, the first moving amount calculating unit 173 controls the focusing lens driving unit 15 to move the focusing lens 113 (i.e., the lens barrel 14) in accordance with the calculated amount and direction.

As described above, if the auto-focusing system focuses on the virtual image of the total station 100, the image of the reflector located at the aiming point is fuzzy. Since the distance to the virtual image of the total station can be considered twice a distance to the reflector, by moving the focusing lens 113 to a position whose distance is half a distance of an object (i.e., the virtual image of the total station 100) currently focused on.

The lens position detecting unit 174 detects a present position p1 of the focusing lens 113 based on data transmitted from the code detector 18. The detected focusing lens position p1 is transmitted to both the distance calculating unit 175 and the second moving amount calculating unit 177.

When the correction switch 172 is depressed, the distance calculating unit 175 calculates an object distance L corresponding to the lens position p1. That is, based on the lens position p1 of the focusing lens 113, the distance at which an object currently focused on is to be located is calculated. Then, the distance calculating unit 175 transmits the calculated distance L to the lens position calculating unit 176.

The lens position calculating unit 176 calculates a distance M, which equals to one half the distance L (½ L), based on the data transmitted from the distance calculating unit 175, and calculates a lens position p2 of the focusing lens 113 corresponding to the calculated distance M. The distance M represents a distance at which an object is focused on if the focusing lens 113 is located at the position p2. Then, the lens position calculating unit 176 transmits the calculated position p2 to the second moving amount calculating unit 177.

The second moving amount calculating unit 177 calculates a difference of the calculated position p2, which is transmitted from the lens position calculating unit 176, with respect to the present position p1, which is transmitted from the focusing lens position detecting unit 174. That is, the second moving amount calculating unit 177 determines a moving amount and direction of the focusing lens 113 from the position p1 to the position p2. Then, the second moving amount calculating unit 177 controls the lens driving unit 15 to move the focusing lens 113 in accordance with the calculation results to move the focusing lens to the position p2.

Alternatively, the control system may store a relationship between the position p1 and the difference (p1–p2) in a memory. In such a case, the distance calculating unit 175, the lens position calculating unit 176, and the second moving amount calculating unit 177 can be omitted, since the moving amount can be obtained directly from the position p1.

As shown in FIGS. 1 through 3, on the top and the bottom portions of the telescope unit 1, two sighting scopes 13, each of which has an optical axis parallel to the sighting axis L1, are provided.

On the both side surfaces of the telescope unit 1, a pair of vertical rotation shafts 1a and 1b, which have the common rotation axis, are protruded.

At the U-shaped portion 2a of the support 2, the telescope unit 1 is vertically rotatably supported. A bearing (not shown) for receiving the rotation shaft 1b is provided on the inner side of the right-hand side member of the support 2 in FIG. 3. On the inner side of the left-hand side member of the support 2 in FIG. 3, a hole 2b is formed. A cylindrical sleeve 21 is fitted into the hole 2b. Further, another sleeve 22 is fitted in the sleeve 21. The sleeve 22 is constituted to have a cylindrical part 22a, an outer flange 22b, and a fitting part 22c. The cylindrical part 22a is rotatably fitted into the sleeve 21.

An anti-slip-off ring 25 is screwed onto a thread formed on the outer circumferential surface of the fitting part 22c in order to prevent the sleeve 22 from slipping off the sleeve 21.

The rotation shaft 1a is fitted into the fitting part 22c, and unitarily fixed to the fitting part 22c.

With the constitution described above, the telescope unit 1 is supported by the support 2, and rotatable about the horizontal axis. Further, the sleeve 22 rotates as the telescope unit 1 rotates.

A rotational scale 23, made of transparent parallel plate, is provided on the outer side of the outer flange 22b. On the rotational scale 23, radially extending graduation lines are formed at equal intervals.

A vertical encoder unit 24 is mounted, on the outer flange unitarily formed an the sleeve 21, for reading the graduation lines an the rotational scale 23. The vertical encoder unit 24 includes an LED (light emitting diode) 244 and a collimator lens 243 for emitting a parallel light beam towards the rotational scale 23, a sub scale plate 241 located on the opposite side, with respect to the rotational scale 23, to the collimator lens 243, and a light receiving circuit 242 which receives the light beam passed through the rotational scale 23 and the sub scale plate 241. The LED 244, collimator lens 243, the sub scale plate 241, the light receiving circuit 242 are supported by a flame member.

The sub scale 241 is a transparent parallel plate, and has two trains of radial graduation lines at the same intervals as the graduation lines of the rotational scale 23. The two trains of radial graduation lines are inner train and outer train, and they have phase difference of one quarter of an interval of the graduation lines.

The light receiving circuit 242 has two light receiving elements which receive light beams passed through the two trains (i.e., the inner and outer trains) of graduation lines on the sub scale plate 241, respectively. Two signals generated by the light receiving elements are transmitted to the surveying control circuit 26.

With the constitution described above, in accordance with the rotation of the telescope unit 1, as the rotational scale 23 rotates, two signals having a phase difference of one-quarter an interval are generated by the vertical encoder unit 24, and the two signals are transmitted to the surveying control circuit 26. The surveying control circuit 26 detects the amount and the direction of the vertical rotation of the telescope unit 1 based on the two signals transmitted from the vertical encoder unit 24.

On the upper surface of the stage 3, a hole 3a is formed. In the hole 3a, the lower end of a sleeve 30, having an outer flange 30a at its upper end portion, is fitted into the hole 3a. On the rim of the outer flange 30a, a main rotational scale plate 31, which is a transparent parallel plate, is fixedly provided. On the main rotational scale plate 31, radial graduation lines are formed at even intervals.

A shaft 27 is rotatably inserted into the sleeve 30. The lower end of the shaft 27 is protruded from the lower end of the sleeve 30, and exposed to the inner surface of the hole 3a. On the outer circumferential surface of the lower end portion of the shaft 27 which is protruded from the lower end of the sleeve 30, a thread is formed, onto which an anti-slip-off ring 32 is screwed. The upper end of the shaft 27 is fitted into a cavity 2c formed on the bottom surface of the support 2, and fixed thereto.

With the constitution described above, the support 2 is mounted on the stage 3, and is rotatable about a vertical axis. In accordance with the rotation of the support 2, the main rotational scale 31 rotates relative to the shaft 27.

An outer flange 27a is formed at the upper end portion of the shaft 27. The outer flange 27a faces the outer flange 30a of the sleeve 30. On the rim of the outer flange 27a, a sub scale 28 is fitted. The sub scale 28 is a transparent parallel plate and has substantially the same shape as that of the main scale plate 31. The sub scale 28 has two trains of radial graduation lines at the same intervals as that of the main rotational scale 31. Two trains of radial graduation lines include the inner train and the outer train, and they have a phase difference of one-quarter an interval of the graduation lines of the main scale 31.

A horizontal encoder unit 29 is secured on the outer flange 27a. The horizontal encoder unit 29 is utilized to read the radial graduation lines on the main rotational scale 31 and the sub scale 28. The horizontal encoder unit 29 includes an LED (light emitting diode) 291 and a collimator lens 292 for emitting a light beam towards the main rotational scale 31, and a light receiving circuit 293 for receiving the light beam passed through the main rotational scale 31 and the sub scale 28. The LED 291, collimator lens 292 and the light receiving circuit 293 are mounted on a flange member.

The light receiving circuit 293 has two light receiving elements respectively for receiving the light beams passed through the two trains (i.e., the inner and outer trains) of scales on the sub scale plate 31. Two signals respectively generated by two light receiving elements are transmitted to the surveying control circuit 26.

With the constitution described above, in accordance with rotation of the support 2, the shaft 27 rotates, together with the horizontal encoder unit 29, relative to the main rotational scale 31, two signals having one-quarter phase difference are generated, and the signals are transmitted to the surveying control circuit 26. The surveying control circuit 26 detects the amount and the direction of the horizontal rotation of the support 2 in accordance with the signals generated by the horizontal encoder unit 29.

As shown in FIGS. 1 and 2, on the front and rear surfaces of the support 2, two operation panels 6 are provided. Various data and operation commands can be input through the panels 6, and data and messages output by the surveying control circuit 26 are displayed on a display area of each operation panel 6.

The surveying control circuit 26 accommodated in the support 2 is connected, via wire w passing through an opening formed in the center of the cylindrical part 22a of the sleeve 22 (FIG. 3), with the distance metering unit 12 provided in the telescope unit 1. The surveying control circuit 26 is also connected with the vertical encoder unit 24, the horizontal encoder unit 29, and the operation panels 6.

The surveying control circuit 26 controls the distance metering unit 12 to operate in accordance with the commands inputted via the operation panels 6, and receives the phase difference data representing the object distance, from the distance metering unit 12. Based on the phase difference of the modulated light beams, the surveying control circuit 26 detects the distance to the aiming point and displays the same on the displaying devices of the operation panels 6.

Further, based on the signals from the vertical encoder unit 24 and the horizontal encoder unit 29, the surveying control circuit 26 outputs the vertical (elevational) and the horizontal angles of the sighting axis L1 with respect to a reference axis, which coincides the sighting axis of the telescope unit 1 when resetting is performed.

A vertical fixing screw 7, which is provided on the rear surface of the support 2, is a screw for fastening and releasing a vertical clamp mechanism (not shown) which restricts rotation of the shaft 1b relative to the support 2. When the vertical fixing screw 7 is fastened, the telescope unit 1 can not be rotated in a vertical direction by external forces.

A horizontal fixing screw 9 (see FIG. 1), which is provided on the side surface of the support 2, is a screw for fastening and releasing a horizontal clamp mechanism (not shown) which restricts the rotation of the sleeve 30 relative to the support 2. When the horizontal fixing screw 9 is fastened, the telescope unit 1 can not be rotated in a horizontal direction by external forces.

A vertical tangent screw 8, which is provided coaxially with the vertical fixing screw 7, is utilized to slowly rotate the telescope unit 1 vertically with respect to the support 2. By turning the vertical tangent screw 8, a vertical rotational position of the telescope unit 1 can be adjusted precisely.

A horizontal tangent screw 10, which is provided coaxially with the horizontal fixing screw 9, is utilized to slowly rotate the telescope unit 1 horizontally with respect to the support 2. By turning the horizontal tangent screw 10, a horizontal rotational position of the telescope unit 1 can be adjusted precisely.

In the upper part of the support 2, over the U-shaped portion 2a, the grip 5 is detachably mounted. When an aiming point is located above the total station, the operator can remove the grip 5 from the support 2 so that the view of the telescope unit 1 will not be obstructed. Further, when an angle formed between an upper-front point and an upper-rear point is to be measured, the operator can also detach the grip 5 from the support 2 so that swinging movement of the telescope unit 1 will not be interfered with by the grip 5.

The leveling board 4 includes an upper plate 4a, a lower plate 4b, and three leveling screws 40 provided between the upper and lower plates 4a and 4b. The leveling screws 40 are provided at equal angular intervals between peripheral portions of the upper and lower plates 4a and 4b. Each leveling screw 40 has a projection, extension amount of which can be varied by turning the leveling screw 40. By adjusting the extension amount of the projection of each of the leveling screws 40, the upper plate 4a is made inclined with respect to the lower plate 4b so that the vertical rotation axis (L2) of the shaft 27 coincides with the direction of gravity.

With the constitution described above, the telescope unit 1 can be aimed to any desired direction. The direction in which the telescope unit 1 is aimed can be detected as horizontal and elevational angles based on the output signals of the vertical encoder unit, 24 and the horizontal encoder unit 29.

The operation of the total station 100 according to the embodiment will be described hereinafter.

Figure 5:
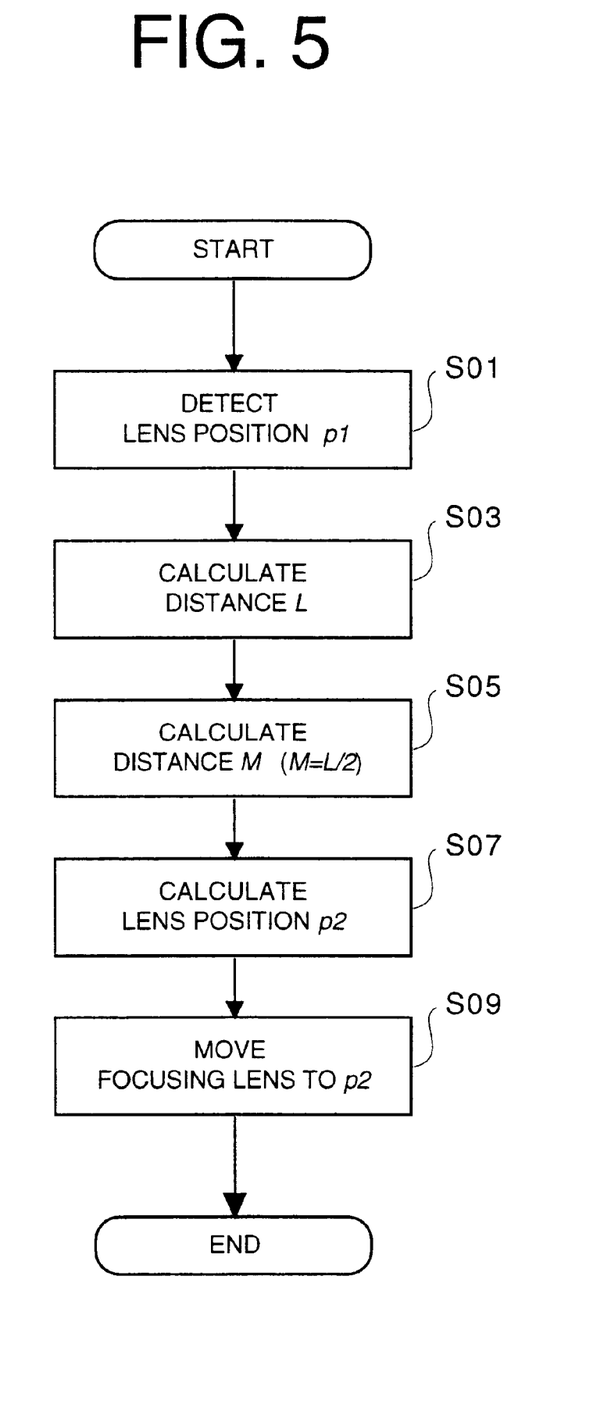
FIG. 5 is a flowchart showing a correction process for driving a focusing lens to focus on an aiming point.

FIG. 5 is a flowchart showing the correction operation for correcting the lens position, which is performed, if necessary, after the auto-focusing operation has been performed.

Initially, the operator places the reflector at an aiming point, installs the total station at a measuring station, and turns on the main switch of the total station.

When the main switch is turned on, the telescope unit 1 is to be roughly moved (i.e., the rough sighting is performed). Accordingly, the sighting scope 13, which has a wider field of view than the telescope 11, is used for sighting the telescope unit 1 at the reflector. For the rough sighting, the telescope unit 1 may be moved by a relatively large amount. Since the moving amount of the telescope unit 1 using the tangent screws 8 and 10 is relatively small, the operator may release the fixing screws 7 and 9, and adjusts the direction of the telescope unit 1 by manually moving the telescope 11.

After the rough sighting has been finished, the operator fastens the fixing screws 7 and 9 in order to prevent the telescope unit 1 from being turned by external forces.

Then, the fine sighting using the telescope 11 is to be performed.

Prior to the fine sighting, the operator depresses the AF switch 171 to start the auto-focusing operation in order to obtain the in-focus image in the field of view of the telescope 11. Then, the first moving amount calculating unit 173 controls the focusing sensor 16 to detect the defocus amount. Based on the detected defocus amount, the first moving amount calculating unit 173 calculates the amount and the direction of the movement of the focusing lens 113 for canceling the defocus, and controls the focusing lens driving unit 15 to move the focusing lens 113 by the calculated movement.

After the focusing lens driving unit 15 has moved the focusing lens 113, the in-focus image of the object on the sighting axis L1 becomes observable within the field of view of the telescope 11.

At this time, however, the reflector may not be located within the field of view of the telescope 11. In such a case, by turning the tangent screws 8 and 10, the operator may attempt to catch the reflector within the field of view of the telescope 11 with holding the AF switch 171 depressed.

When the reflector is not caught precisely at the center area of the field of view, the telescope 11 may not focus on the reflector, and the image of the reflector may be observed an out-of-focus image.

If the tangent screws 8 and 10 are further operated and the reflector is located sufficiently close to the center of the field of view, the focusing sensor 16 detects the virtual image of the total station 100, i.e., the total station reflected by the reflector. Then, the focusing lens 113 is moved to focus on an object whose object distance is twice the object distance of the reflector, and accordingly, the image of the reflector is fuzzy.

At this stage, the operator judges whether the telescope focuses on the reflector or the image of the total station. If the operator judges that the telescope 11 focuses on the reflector, no operation is required. However, if the operator judges that the telescope focuses on the image of total station rather than the reflector, the correction switch 172 is to be depressed.

When the correction switch 172 is depressed, the correction process shown in FIG. 5 is initiated. In the correction process, firstly, the lens position detector detects the current position p1 of the focusing lens 113 based on the code data transmitted from the code detector 18 (SO1). Then, the distance calculating unit 175 calculates the distance L corresponding to the position p1 (SO3) The focusing lens position calculating unit 176 calculates a distance M which is one-half distance of L (i.e., M=L/2) (SO5), then calculates a new position p2 at which the focusing lens 113 is to be located (SO7).

The second moving amount calculating unit 177 controls the focusing lens driving unit 15 to move the focusing lens 113 to the position p2 (SO9). With the above control, the in-focus image of the reflector, caught in the exact center of the field, can be obtained.

During the process described above, the surveying control circuit 26 detects the vertical angle and the horizontal angle of the telescope 11 based on the signals from the encoders 24 and 29, and displays these angles on the operation panel 6. The operator may input a distance metering start command via the operation panel 6. According to the command, the surveying control circuit 26 controls the electronic distance metering unit 12 to start distance metering. The surveying control circuit 26 calculates the distance to the aiming point, and displays the calculated distance on the operation panel 6.

As described above, the total station according to the present invention can focus on the reflector by depressing the correction switch 172, even if the auto-focusing system focuses on the virtual image of the total station formed by the reflector.

The present disclosure relates to the subject matter contained in Japanese Patent Application No. HEI 10-99688, filed on Apr. 10, 1998, which is expressly incorporated herein by reference in its entirety.

What is claimed is:

1. A surveying instrument, comprising:

a sighting telescope that is utilized to sight on a reflector located at an aiming point;

an auto-focusing system which adjusts a focusing state of an image in a field of view of said sighting telescope;

a switch; and a correction system that controls said auto-focusing system, in response to an operation of said switch, to correct a focusing state of the image of said sighting telescope from a first state to a second state, said first state being a state where an object whose object distance is a first distance is focused on, said second state being a state where an object whose object distance is a second distance is focused on, said second distance being substantially a half of said first distance.

2. The surveying instrument according to claim 1, wherein said auto-focusing system includes:

a focusing lens;

a defocus amount detecting system that detects a defocus amount with respect to a predetermined image receiving plane of said sighting telescope; and a first driving amount calculating system that calculates a driving amount of said focusing lens of said auto-focusing system based on said defocus amount.

3. The surveying instrument according to claim 2, wherein said correction system includes:

a lens position detecting system that detects a first position of said focusing lens when focusing on an object located at said first distance;

a lens position determining system that determines, based on said first position, a second position of said focusing lens for focusing on an object located at said second distance;

a lens driving system that drives said focusing lens to said second position.

4. The surveying instrument according to claim 3, wherein said lens position determining system includes:

a first distance calculating system that calculates said first distance based on said first position detected by said lens position detecting system; and a lens position calculating system that calculates said second position for focusing on an object located at a distance which is a half of said first distance;

wherein said lens driving system drives said focusing lens by an amount which is equal to a difference between said second position and said first position.

5. The surveying instrument according to claim 1, including an electronic theodolite.

6. The surveying instrument according to claim 1, including a distance metering device.

7. The surveying instrument according to claim 1, wherein said reflector comprises a corner cube.

* * * * *